(12) United States Patent
Shi et al.

(10) Patent No.: US 6,660,319 B1
(45) Date of Patent: Dec. 9, 2003

(54) FLAVORS FOR PET FOOD AND METHOD OF MANUFACTURE

(75) Inventors: Zulin Shi, Naperville, IL (US); Jeff Alix, Kankakee, IL (US); Hui-Chen Li, Aurora, IL (US); Paul Nowaczyk, Wheaton, IL (US); Jiunn-yann Tang, Oak Brook, IL (US)

(73) Assignee: Bioproducts, Inc., Fairlawn, OH (US)

( * ) Notice: Subject to any disclaimer, the term of this patent is extended or adjusted under 35 U.S.C. 154(b) by 417 days.

(21) Appl. No.: 09/262,471

(22) Filed: Mar. 4, 1999

(51) Int. Cl.[7] .............................. A23L 1/22; A23L 2/56
(52) U.S. Cl. ..................... 426/533; 426/534; 426/536
(58) Field of Search ............................... 426/533, 534, 426/536, 630

(56) References Cited

U.S. PATENT DOCUMENTS

| | | | |
|---|---|---|---|
| 3,642,497 A | 2/1972 | Gunther | 99/140 |
| 3,645,754 A | 2/1972 | Wiener | 99/140 |
| 3,754,934 A | 8/1973 | Pittet et al. | 99/140 |
| 3,892,878 A | 7/1975 | Wilson et al. | 426/534 |
| 3,900,581 A * | 8/1975 | Winter et al. | 426/535 |
| 4,045,587 A | 8/1977 | Katz et al. | 426/533 |
| 4,076,852 A * | 2/1978 | Van Delft et al. | 426/533 |
| 4,080,367 A * | 3/1978 | Van Den Ouweland et al. | 260/347.2 |
| 4,315,952 A | 2/1982 | Boden | 426/536 |
| 4,643,908 A | 2/1987 | Sawhill | 426/630 |
| 5,039,543 A | 8/1991 | Lee et al. | 425/533 |
| 5,186,964 A | 2/1993 | Gierhart et al. | 426/74 |
| 5,368,876 A * | 11/1994 | Van den Heuvel et al. | 426/535 |

FOREIGN PATENT DOCUMENTS

EP 0 778 350 A1 6/1997

OTHER PUBLICATIONS

Solomon., Organic Chemistry., Fourth Edition., p. 542–543, 1988.*
Hawley., The Condensed Chemical Dictionary., Tenth Edition., p. 32, 1019, 619, 1981.*
May., Thermal Process Flavourings., Food Flavourings, Edited by P.R. Ashurst., p 276–303, 1988.*

* cited by examiner

*Primary Examiner*—Arthur L. Corbin
(74) *Attorney, Agent, or Firm*—Fay, Sharpe, Fagan, Minnich & McKee, LLP

(57) ABSTRACT

A method of producing pet food flavors comprising combining at elevated temperature at least one sulfur containing compound and at least one carbohydrate, with preferably, at least one nitrogen containing compound to form a reaction product and combining said reaction product or said reaction product in blended flavors with a pet food.

15 Claims, No Drawings

FLAVORS FOR PET FOOD AND METHOD OF MANUFACTURE

BACKGROUND OF THE INVENTION

This invention is directed to a flavorant for pet food and a method of its manufacture. Particularly, this invention relates to a pet food flavor providing a savory flavor such as meat. More particularly, this invention relates to a process for improving the palatability of pet foods of either low or high moisture content by enhancing the flavor to increase its acceptability to cats and dogs.

It should be understood that the expression "dry pet food" as used herein includes foods having a low moisture content. For example, dry pet food may contain less than about 20% moisture so that the free water content is generally not sufficient to support the growth of microorganisms. High moisture content pet food is intended to include the semi-moist and canned types of foods. The invention is applicable to all types, but is particularly significant with dry foods which often are least appealing to domestic animals.

Advantages associated with dry pet foods are that they are generally more nutritious, on an equal weight basis, require less expensive packaging, and are more convenient to use than moist foods. However, domestic animals are often quite particular in their tastes and, therefore, improving palatability significantly improves the deliverability of a dry food. To improve taste, a variety of materials have been utilized to coat the surface and/or are mixed with the dry constituents to enhance the flavor. For example, phosphoric acid has been coated onto the surface of a dry cat food as a palatability enhancer. More specifically, U.S. Pat. No. 3,679,429 discloses a method for improving palatability of dry cat food by coating pellets of food with fat and palatability enhancing acids such as phosphoric or citric.

Palatability of dry pet foods may also be enhanced by the application of flavors. As an example, flavors are described in U.S. Pat. No. 5,186,964 as meat and cheese flavorings.

However, the use of meat or cheese flavoring is not always easy to accomplish. One complication in developing flavorants and palatability enhancers for pets is unpredictability. Moreover, flavorants which work effective with humans do not often work as effectively with pets. Similarly, a flavorant which is effective with one species may not work as well with a different animal group. Furthermore, pets are unable to express their preferences in an effective manner. Accordingly, palatability testing must be employed.

One primary area of focus has been to provide pet foods with a savory meat flavor. In fact, this effort exists simultaneously with respect to flavoring human foods. In animals, this has typically been accomplished using poultry viscera, heart and liver digests. However, this flavorant system is somewhat undesirable because it cannot meet with the increasing demand for palatability of pet foods, especially dry pet foods.

In humans, artificial meat flavorants have been investigated as demonstrated in U.S. Pat. No. 5,039,543 wherein it is disclosed that phospholipids, create a desirable meat aroma. Specifically, a flavorant stated to have a savory meat aroma and flavor is comprised of a phospholipid of animal origin and a sulfur containing compound which is reactive with the phospholipid. Similarly, in U.S. Pat. No. 4,045,587, herein incorporated by reference, a meat flavorant comprised generally of a cyclic carbonyl compound is disclosed. Further discussion of artificial meat flavors is provided in U.S. Pat. No. 3,892,878, herein incorporated by reference, wherein it is stated that certain alkane thiols and alkane mercapto sulfides alter the flavor of foodstuff to provide a roasted meat taste for humans.

Interestingly, notwithstanding the alleged success of these various artificial meat flavors, many human foods still rely on a combination of natural flavors and yeast. Furthermore, there has been no successful development of an artificial meat flavorant which has demonstrated success in meeting the particular and unique palatability demands of domestic animals.

Therefore, it would be desirable in the art of animal feed, to have available a meat flavorant which is easily storable, preservable and relatively inexpensive yet provides a savory meat-type flavor.

SUMMARY OF THE INVENTION

Accordingly, it is a primary object of this invention to provide a new and improved flavorant for animal feeds.

It is an advantage of this invention to provide a new and improved flavorant which imparts a meaty aroma and taste to pet food.

A still further object of this invention is to provide a new and improved flavorant which can be applied topically to pet food bases of either high or low moisture content or incorporated into the pet food bases of either low or high moisture content prior to production process, such as extrusion and canning/retorting.

Yet another advantage of this invention is to provide a new and improved method for the manufacture of the subject flavorant.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the flavorant of this invention is manufactured in accord with a process comprising combining at an elevated temperature, at least one sulfur containing compound, at least one carbohydrate, and preferably at least one nitrogen-containing compound such as an amino group to form a reaction product. The formed reaction product is then combined with a base food.

Preferably, the amino-containing compound is selected from the group of ammonium sulfide, ammonium sulfate, ammonium hydrogen sulfate, diammonium carbonate, ammonium bicarbonate, ammonium chloride, ammonium nitrate, ammonium hydroxide, di-ammonium phosphate, and mixtures thereof. Preferably, the sulfur containing compound is selected from the group of ammonium sulfide, sodium sulfide, sodium sulfhydrate, potassium sulfide, hydrogen sulfide and mixtures thereof. A particularly preferred form of the invention uses ammonium sulfide to provide both the nitrogen and sulfur containing compounds.

Preferably, the carbohydrate is a reducing sugar. More preferably, the carbohydrate is a monosaccharide such as xylose, hexose, pentose, glucose, fructose, starch hydrolates or molasses. In addition, the reaction mixture will also preferably contain an animal digest, i.e., animal tissue.

The reaction process is preferably performed in a temperature range of 80 to 160° C. under a pressure of between 47 to 617 Kpa. In a further preferred form of the invention the reaction is conducted at a pH of between 2.6 and 12.0.

In a particularly preferred form of the invention, the reaction is carried out in a manner resulting in the production of at least one of the compounds selected therefrom the group consisting of: 2-Ethyl furan; 2,3-dihydrothiophene; Methyl pyrazine; 2-furanmethanol; Ethyl pyrazine; 2-Ethyl-5-Methyl pyrazine; 2-Methyl-6-(Methio)-pyrazine; 2,5-Dimethyl furan; 2-Methyl thiophene; Methyl Ethyl disulfide; 2,5-Dimethylpyrazine; 2-Methyl-1-Ethyl pyrrolidine; 2-Ethyl-6-Methyl pyrazine; 2-[(methyldithio)Methyl]-furan; Pyrazine; 3-Methyl thiophene; 2-(2-propenyl)-furan; 2,6-Dimethylpyrazine; Dimethyl trisulfide (DMTS); 5-Methyl-2-thiophenecarboxaldehyde; Benzo[b]thiophene-4-ol; propanoic acid; 4-Methyl thiazole; 2,5-diMethyl thiophene; Ethyl, Thiazone; Dihydro-2-Methyl-3(2H)-thiophene; Methyl-2-Methyl-3-furyl disulfide. Preferably, 3-Methyl thiophene will form at least 7 ppm of the reaction product.

The reaction flavor can be dried with conventional commercial drying processes, such as spray drying, drum drying, and vacuum drying.

DETAILED DESCRIPTION OF THE INVENTION

Reference will now be made in detail to the present preferred embodiment of the invention. While the invention will be described in connection with a preferred procedure, it will be understood that it is not intended to limit the invention to that procedure. On the contrary, it is intended to cover all alternatives, modifications and equivalents as may be included within the spirit and the scope of the invention defined by the appended claims.

Due to the lack of direct feedback from animal test subjects, the prevailing measurement of pet food flavor performance in the pet food industry is a two bowl, free choice methodology based on individual animal feed intake ratio with a minimum of 20 animals (dogs or cats) per test for two day duration as described in *Palatability Testing: Two-Part Tests, Methods and Data Analysis Techniques*; Griffin, R., September/October Pet Food Industry, 1996. Moreover, the complexities associated with the food evaluation process can be reduced by dealing fundamentally with the behavior of the animals. Specifically, it is assumed that the greater the food intake, the more palatable the food is. Such an assumption allows conclusions or inferences to be made about the animals cognitive evaluation of the food.

The present invention is directed to a process for producing and the resultant reaction product, which is believed to provide an enhanced meaty flavor to dry or high moisture content animal feed. Specifically, the invention uses sulfur and nitrogen containing compounds in a mixture with a carbohydrate, especially reducing sugars, at elevated temperatures, to generate a flavorant that can significantly improve the palatability performance of pet foods. The range of reaction temperatures is generally from about 80° C. to 160° C., preferably 100° C. to 150° C., more preferably 105° to 140° C., under a pressure in the range of 120 to 316 Kpa. The reaction is typically conducted in a water environment or a non-aqueous environment such as glycerin, propyl glycol or fat comprising from 0.1 to 95% moisture, and preferably from 50 to 85% by weight based on the total weight of the reaction mixture.

The reaction can take place over any suitable period of time, however, 10 to 90 minutes has been found to be generally sufficient. Nonetheless, 10 minutes to 5 hours provides an acceptable rule of thumb. More specifically, the time of the reaction is often more dependant on the amount of time it takes to heat up the mixture to the desired final temperature and the time it takes to cool the reaction down sufficiently to terminate reactive mechanisms. However, the reaction time is recognized to impact on what reaction products are obtained.

The preferred nitrogen and sulfur containing compounds include ammonium sulfide, hydrogen sulfide, ammonium hydroxide, sodium sulfide, sodium sulfhydrate, di-ammonium phosphate, and combinations thereof. However, any nitrogen or sulfur containing compounds could be used in the process provided that the desired reaction products are obtained. Importantly, a carbohydrate is also included in the mixture, the preferred carbohydrates being reducing sugars such as xylose, fructose and glucose. The reducing sugar, preferably comprises from 0.1 to 20%, and preferably from 0.3 to 5% by weight in total of the reaction mixture.

The concentration of the nitrogen containing compounds is preferably from 10 to 80 mM, more preferably from 20 to 50 mM. The concentration of the sulfur containing compounds is preferably from about 1.0 to 50 mM, more preferably 5. to 40 mM, and most preferably 10 to 30 mM. In addition, the reaction mixture can be formulated to contain animal fats at a level of 5 to 20% and preferably 10 to 25 weight % based on the total weight of the reaction mixture.

At the higher pH's, the reaction favors more of the N-containing heteralcylcic compounds such as pyrazines. At a lower pH, the reaction favors more of the S-containing heterocyclic compounds, such as thiophenes, thiozoles and sulfides. However, while specific N and S containing heterocyclic compounds are favored at one pH than the other, a certain quantity of both N and S containing heterocyclic compounds are formed under either alkaline pH or acid pH. A particularly preferred pH range for conducting the reaction is between 3 to 11.5, more preferably from 4 to 10. It should be noted that the pH is preferably adjusted in the mixture by the addition of orthophosphoric acid to lower the pH or sodium hydroxide to raise the pH.

The amino and sulfur containing compound employed in the invention is most preferably ammonium sulfide solution of 0.5% to 50% which contains the active reagent compounds $NH_3$ and sulfide anions resulting in the formation of hydrogen sulfide in the mixture under an acidic condition.

The flavorants produced in the form of the reaction product of the above-discussed reaction can be used in the produced form or can be blended with other ingredients to form a blended flavor or, in fact, can be dried and used in a dry form. More specifically, carriers such as animal digests, the starting mixture of the present reaction, or generally accepted carbohydrates such as maltodextrins can be utilized to disperse and apply the subject flavorant. Similarly, the subject flavorant could be simply be added as a further ingredient to the palatability enhancing composition described in U.S. Pat. No. 5,000,973, or any other similar system.

As articulated above, the reaction can be generally tailored based on time, temperature and pH conditions to achieve a variation in the reaction products. Specifically, the type and quantity of the N and S containing compounds can be varied. The desired quantity of the nitrogen or sulfur containing compounds depends on the final application, i.e., the application rate may vary depending on the type of pet food base. Nonetheless, the process preferably results in the production of at least one of: 2-Ethyl furan; 2,3-dihydrothiophene; Methyl pyrazine; 2-furanmethanol; Ethyl pyrazine; 2-Ethyl-5-Methyl pyrazine; 2-Methyl-6-(Methio)-pyrazine; 2,5-Dimethyl furan; 2-Methyl thiophene; Methyl Ethyl disulfide; 2,5-Dimethylpyrazine; 2-Methyl-1-Ethyl pyrrolidine; 2-Ethyl-6-Methyl pyrazine; 2-[(methyldithio) Methyl]-furan; Pyrazine; 3-Methyl thiophene; 2-(2-propenyl)-furan; 2,6-Dimethylpyrazine; Dimethyl trisulfide (DMTS); 5-Methyl-2-thiophenecarboxaldehyde; Benzo[b]thiophene-4-ol; propanoic acid; 4-Methyl thiazole; 2,5-diMethyl thiophene; Ethyl Thiazone; Dihydro-2-Methyl-3(2H)-thiophene; Methyl-2-Methyl-3-furyl disulfide and mixtures thereof. Preferably, 3-Methyl thiophene will comprise at least one of these reaction products. In fact, it is preferred that 3-Methyl thiophene comprises at least 7 ppm by weight and more preferably at least 200 ppm of the overall reaction product.

A base food composition as used herein refers to the dry pet foods to which a flavor composition is added. The base food composition typically includes at least one of the following; poultry or beef byproducts; vegetable protein meal; animal protein; animal tissue or meal; grain such as corn, mylo, alfalfa, wheat, soy and the like; carbohydrates; fat, e.g. and preservatives. However, it is intended that the invention is not to be limited to any specific recitation of food ingredients, or to any additives other than the flavorant compositions according to the invention. In this regard, the preferred base food compositions are those that are available and are nutritionally balanced.

EXAMPLES

The following examples are given to illustrate embodiments of the invention. It will be understood that these examples are illustrative and the invention is not to be considered as restricted thereto except as indicated in the appended claims.

The Control Reaction Flavor

The control reaction flavor was composed of a blend of one stream of animal digest (composed of primarily the poultry heart and livers) treated with enzyme, plus 1% xylose. This control reaction blend was reacted at 90° C. for one hour at pH 8.0.

The Control Flavor Blend

The control flavor blend was composed of primarily a) 78.9% poultry digest subjected to indigenous and external enzyme breakdown process, b) 20% of the control reaction flavor and c) other minute compounds.

The Test Flavor Blend

The test flavor blend was basically the same formula as the control flavor blend, and was composed primarily of a) 78.9% poultry digest subjected to indigenous and external enzyme breakdown process, b) 20% of a test reaction flavor (examples) and c) other minute compounds.

The flavor blend and reaction flavor samples were prepared and determined for palatability performance in accordance with the procedures described in animal feeding test procedure sections.

Animal Feeding Test Procedure

The control flavor blend and test flavor blend as described above were coated on a prevailing maintenance diet and fed to animals in a two-bowl protocol with a minimum of 20 animals. The individual animal feed intake ratio was evaluated statistically in a group-pooled ratio. The different consumption ratio of the foods coated with control flavor blend and test flavor blend was declared statistically significant or insignificant based on the t-test.

Example I

The test reaction flavor is composed of a) the same general poultry viscera digest used in the control reaction flavor, b) 1% xylose, and c) 0.5% ammonium sulfide solution of 23.2% solution (from Aldrich Chemical). It is reacted at 100° C. for 60 minutes at pH 8.0. It was found that the test flavor blend with this test reaction flavor was significantly more palatable than the control flavor blend. Particularly, a consumption ratio of 2:1 (test:control) was demonstrated.

Example II

The test reaction flavor had a similar composition as in Example I, but was reacted in 130° C. for 10 to 20 minutes at pH 6.0 with 1% ammonium sulfide solution. It was found that the test flavor blend with this test reaction flavor was significantly more palatable than the control flavor blend. Particularly, a consumption ratio of 2.5:1 (test:control) was demonstrated.

Example III

The test reaction flavor was comprised of and reacted at the same conditions as in Example II, except that ammonium sulfide solution was replaced with equal mole of sodium sulfide. It was found that the test flavor blend with this test reaction flavor was more palatable than the control flavor blend. Particularly, a consumption ratio of 1.5–2:1 (test:control) was demonstrated.

Example IV

The test reaction flavor was comprised of and reacted at the same conditions as in Example II, except that ammonium sulfide solution was replaced with equal mole of sodium sulfide and twice amount of mole of ammonium hydroxide. It was found that the test flavor blend with this test reaction flavor was significantly more palatable than the control flavor blend. Particularly, a consumption ratio of 1.5:1 (test:control) was demonstrated.

Example V

The test reaction flavor was comprised of and reacted in the same conditions as in the Example II, except that ammonium sulfide solution was replaced with equal mole of sodium sulfide and di-ammonium phosphate. It was found that the test flavor blend with this test reaction flavor was significantly more palatable than the control flavor blend. Particularly, a consumption ratio of 2:1 (test:control) was demonstrated.

Example VI

The test reaction flavor was composed of a) a general poultry heart and liver digest, b) 1% xylose and c) 0.5% ammonium sulfide solution of 23.3% solution (from Aldrich Chemical). It was reacted at 130° C. for 15 minutes at pH 6.0. It was found that the test flavor blend with this test reaction flavor was significantly more palatable than the control flavor blend. Particularly, a consumption ratio of 3.8:1 (test:control) was demonstrated.

Example VII

The test reaction flavor was comprised of and reacted at the same conditions as in Example II, while the control reaction flavor was composed of a) a general poultry digest, b) 1% xylose, and c) cysteine, the cysteine was present at equal mole as the ammonium sulfide solution used in Example II. Cysteine is one of the most common S-containing amino acids used in human savory reaction flavors. It is reacted at 95° C. for one hour at pH 6.0. It was found that the test flavor blend with this test reaction flavor was significantly more palatable than the control flavor blend. Particularly, a consumption ratio of 3:1 (test:control) was demonstrated.

Example VIII

The test reaction flavor was the same as in Example II, while the control reaction flavor was the same as in the Example VII except it was reacted at 130° C. for 15 minutes at pH 6.0. It was found that the test flavor blend with this test reaction flavor was significantly more palatable than the control flavor blend. Particularly, a consumption ratio of 1.7:1 (test:control) was demonstrated.

Example IX

The test reaction flavor was the same as in Example II, but was subjected to spraying drying with the addition of the common carrier maltodextrin. It was found that the dried version of test reaction flavor maintained the same palatability as the liquid form in the same test flavor blend formula as in Example II.

Example X

The test reaction flavor and the test flavor blend were the same as in Example II. The series of control flavors were 97%, 98% and 99% of poultry digest plus respectively 1%, 2% and 3% concentrated chicken flavors supplied by IFF for human consumption. The test flavor blend containing the test reaction flavor was superior to the control flavor blend in palatability. Particularly, a consumption ratio of 1.8–2.5:1 (test:control) was demonstrated.

Example XI

The test reaction flavor and the test flavor blend were the same as in Example II. The series of control flavors were 1.6% of dried commercial flavor samples of savory poultry (Ohly CHTA), roasted meat (Biozyst®) and roasted poultry (Provesta®) types made with yeast extracts, plus about 18% water, and 80% poultry digest. The 1.6% dried flavors in the control flavor blend plus 18% of water is equivalent to the solids and moisture content of 20% reaction flavors in the test flavor blend. The test flavor blend containing the test reaction flavors was superior to the control flavor blend in palatability. Particularly, a consumption ratio of 1.6–2.5:1 (test:control) was demonstrated.

Accordingly, in view of the above examples, it is clear that typical human flavorants were inferior relative to the present inventive compounds. Thus, it is apparent that there has been provided, in accordance with the invention a method for producing a flavorant for pet food that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A method for producing pet food flavors comprising combining at elevated temperature ammonium sulfide, at least one reducing carbohydrate, an animal digest, and optionally at least one nitrogen containing compound to form a reaction product.

2. The method of claim 1 wherein said nitrogen containing compound is selected from the group consisting of ammonium sulfate, ammonium hydrogen sulfate, diammonium carbonate, ammonium bicarbonate, ammonium chloride, ammonium nitrate, ammonium hydroxide, di-ammonium phosphate and mixtures thereof.

3. The method of claim 1 wherein said reducing sugar is selected from the group consisting of xylose, pentose, glucose, fructose, starch hydrolysates, molasses, and mixtures thereof.

4. The method of claim 1 further comprising combining said reaction product with a lipid, preservatives, or nutrient.

5. The method of claim 1 wherein said elevated temperature is between 80 and 160° C.

6. The method of claim 1 further comprising performing said reaction at a pressure of 47 to 617 Kpa.

7. The method of claim 1 wherein said reaction is performed at a pH of between 2.6 to 12.0.

8. The method of claim 1 wherein said carbohydrate is xylose.

9. The method of claim 1 being formed in an aqueous environment.

10. The method of claim 1 wherein said reaction product includes at least 3-methyl thiophene.

11. The method of claim 1 wherein said reaction product is coated on the exterior of a pet food.

12. The process of claim 1 wherein said reaction product is mixed into a pet food.

13. A flavorant for an animal pet food prepared by a process comprising combining at elevated temperature ammonium sulfide at least one reducing carbohydrate and an animal digest to form a reaction product.

14. A pet food flavorant comprised of water, 3-methyl thiophene, a reducing sugar, an animal digest, and at least one compound selected from 2-ethyl furan; 2,3-dihydrothiophene; methyl pyrazine; 2-furanmethanol; ethyl pyrazine; 2-ethyl-5-methyl pyrazine; 2-methyl-6-(methio)-pyrazine; 2,5-dimethyl furan; 2-methyl thiophene; methyl ethyl disulfide; 2,5-dimethylpyrazine; 2-methyl-1-ethyl pyrrolidine; 2-ethyl-6-methyl pyrazine; 2-[(methyldithio)methyl]-furan, pyrazine; 2-(2-propenyl)-furan; 2,6-dimethylpyrazine; dimethyl trisulfide (DMTS); 5-methyl-2-thiophenecarboxaldehyde; benzo[b]thiophene-4-ol; propanoic acid; 4-methyl thiazole; 2,5-dimethyl thiophene; ethyl thiazone; dihydro-2-methyl-3(2H)-thiophene; methyl-2-methyl-3-furyl disulfide and mixtures thereof.

15. A pet food including a flavorant formed from a process comprising combining at elevated temperature ammonium sulfide, at least one reducing carbohydrate, an animal digest and optionally at least one nitrogen containing compound to form a reaction product and combining said reaction product with a pet food.

* * * * *